United States Patent
Bae et al.

(10) Patent No.: US 8,730,282 B2
(45) Date of Patent: May 20, 2014

(54) 2D/3D SWITCHABLE BACKLIGHT UNIT AND IMAGE DISPLAY DEVICE

(75) Inventors: Jung-mok Bae, Seoul (KR); Hoon Song, Yongin-si (KR); Yun-woo Nam, Yongin-si (KR); Hong-seok Lee, Seongnam-si (KR); Mi-jeong Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 635 days.

(21) Appl. No.: 13/020,896

(22) Filed: Feb. 4, 2011

(65) Prior Publication Data

US 2011/0187764 A1 Aug. 4, 2011

(30) Foreign Application Priority Data

Feb. 4, 2010 (KR) .......................... 10-2010-0010613

(51) Int. Cl.
G09G 5/02 (2006.01)

(52) U.S. Cl.
USPC .......................... 345/697; 345/102; 349/113

(58) Field of Classification Search
USPC ........ 345/87, 102, 697; 349/56, 84, 104, 110, 349/113
See application file for complete search history.

(56) References Cited

U.S. PATENT DOCUMENTS

| 8,218,096 B2 * | 7/2012 | Cha et al. .......................... 349/15 |
| 8,373,684 B2 * | 2/2013 | Kim et al. ...................... 345/204 |
| 2008/0198292 A1 | 8/2008 | Marra et al. |
| 2010/0097449 A1 * | 4/2010 | Jeong et al. ...................... 348/59 |

FOREIGN PATENT DOCUMENTS

| JP | 2004-139056 | 5/2004 |
| KR | 10-2007-0001533 | 1/2007 |
| KR | 10-2008-0000425 | 1/2008 |
| KR | 10-2008-0004634 | 1/2008 |
| KR | 10-2008-0105572 | 12/2008 |

* cited by examiner

Primary Examiner — Kimnhung Nguyen
(74) Attorney, Agent, or Firm — NSIP Law

(57) ABSTRACT

A 2D/3D switchable backlight unit and an image display device employing the same are provided. The 2D/3D switchable backlight unit includes a light source, a light guide plate in which light emitted from the light source is total-internal-reflected, and a switch array comprising a plurality of switches that selectively contact a first surface of the light guide plate and emit light by frustrated total internal reflection inside the light guide plate. In 2D mode, each of the switches contacts the first surface of the light guide plate. In 3D mode, some of the switches contact the first surface of the light guide plate.

31 Claims, 9 Drawing Sheets

2D/3D SWITCHABLE BACKLIGHT UNIT AND IMAGE DISPLAY DEVICE

CROSS-REFERENCE TO RELATED APPLICATION(S)

This application claims the benefit of Korean Patent Application No. 10-2010-0010613, filed on Feb. 4, 2010, in the Korean Intellectual Property Office, the entire disclosure of which is incorporated herein by reference for all purposes.

BACKGROUND

1. Field

The following description relates to a two-dimensional/three-dimensional (2D/3D) switchable backlight unit and an image display device employing the same, and more particularly, to a 2D/3D switchable backlight unit that uses frustrated total internal reflection of a light guide plate and an image display device employing the 2D/3D switchable backlight unit.

2. Description of the Related Art

Recently, as the flat panel display market has become saturated, the flat panel display industry is seeking new markets. For example, stereoscopic image display devices have attracted attention as a next-generation application for the flat panel display industry. At present, movie theaters and flat panel display-based TVs generally use image display devices such as eyeglasses to generate a three-dimensional (3D) image. However, the use of glasses is cumbersome and requires additional action by a viewer. Accordingly, techniques for 3D image display devices that do not use glasses are under consideration and development.

In the image display devices that do not use glasses, to be compatible with the existing video panels and contents, the display should be able to switch between displaying two-dimensional (2D) and three-dimensional (3D) images. However, for 3D the image display devices that do not use glasses, a switching device for switching between the 2D and 3D images is needed.

SUMMARY

In one general aspect, there is provided a two-dimensional/three-dimensional (2D/3D) switchable backlight unit comprising a light source, a light guide plate in which light emitted from the light source is total-internal-reflected, and a switch array comprising a plurality of switches that selectively contact a first surface of the light guide plate and emit light by frustrated total internal reflection inside the light guide plate, wherein, in 2D mode, all the switches contact the first surface of the light guide plate, and in 3D mode, some of the switches contact the first surface of the light guide plate.

The 2D/3D switchable backlight unit may further comprise a lens array for directing the light emitted from the switch array into at least two different view zones.

The lens array may comprise a plurality of semi-cylindrical lenses arranged in parallel or in a 2D array.

The switch may comprise a first substrate in contact with the first surface of the light guide plate and that has a refractive index that is substantially the same as that of the light guide plate, a second substrate spaced apart from the first substrate, a first medium formed between the first substrate and the second substrate and that has a refractive index that is the same as or higher than that of the first substrate, a transparent second medium formed between the first substrate and the second substrate that is not mixed with the first medium and that has a refractive index lower than that of the first substrate, a barrier wall dividing the space formed between the first substrate and the second substrate into a plurality of cells arranged in a 2D array, and a driving electrode unit disposed in at least one substrate from among the first substrate and the second substrate to control contact between the first substrate and the first medium.

The first medium may be an oil-based medium, and the second medium may be a water-soluble medium.

A reflective material may be formed in an interface between the first medium and the second medium.

The driving electrode unit may comprise a first electrode pattern disposed on an upper surface of the first substrate, a first insulating layer that covers the first electrode pattern and that has an upper surface that has a hydrophobic property, a second substrate spaced apart from the first substrate, a second electrode pattern disposed on a lower surface of the second substrate, and a second insulating layer that covers the second electrode pattern and that has a lower surface that has a hydrophobic property.

The switch array may further comprise a passive matrix driving circuit or an active matrix driving circuit for applying a voltage to the driving electrode unit.

The first substrate and the light guide plate may be formed as one body.

The switch may comprise a first substrate in contact with the first surface of the light guide plate and that has a refractive index that is substantially the same as that of the light guide plate, a membrane disposed between the first substrate and the second substrate and that is elastically deformed to contact the first substrate, a barrier wall dividing a space formed between the first substrate and the second substrate into a plurality of cells arranged in a 2D array and supporting the membrane, and a driving electrode unit disposed in at least one substrate from among the first substrate and the second substrate to control contact between the first substrate and the membrane.

The membrane may comprise a deformed layer formed adjacent to the first substrate and formed of a transparent elastic material that has a refractive index that is the same as or higher than that of the first substrate, and a transparent membrane electrode disposed on the deformed layer.

The switch array may further comprise a passive matrix driving circuit or an active matrix driving circuit for applying a simple voltage to the driving electrode unit.

The first substrate and the light guide plate may be formed as one body.

An optical pattern may be formed in a second surface of the light guide plate facing the first surface of the light guide plate to guide light that has entered the light guide plate to be total internal reflected.

In another aspect, there is provided a 2D/3D switchable image display device comprising an image panel forming an image by modulating light according to image information, a backlight unit for emitting light to the image panel, the backlight unit comprising a switch array that includes a light source, a light guide plate in which the light emitted from the light source is total-internal-reflected, and a plurality of switches that selectively contact a first surface of the light guide plate, wherein the switch array emits light by frustrated total reflection inside the light guide plate corresponding to a contact portion between the switch and the first surface, and a control unit for controlling the switch array such that all of the switches contact one surface of the light guide plate in a 2D mode and such that some of the switches contact the one surface of the light guide plate in a 3D mode.

The control unit may control the image panel to sequentially display images corresponding to different viewpoints in a 3D mode, and may control the backlight unit such that the switch array emits light corresponding to a viewpoint of the displayed image.

The 2D/3D switchable image display device may further comprise a lens array for directing the light emitted from the switch array to at least two different view zones.

The lens array may comprise a plurality of semi-cylindrical lens arranged in parallel or in a 2D array.

The control unit may control the image panel to display elementary images based on an integral imaging technology and may control the backlight unit such that the switch array drives the switch corresponding to the displayed elementary images.

The control unit may control the image panel to display an image corresponding to one viewpoint and controls the backlight unit such that each of the switches of the switch array emits light.

The switch may comprise a first substrate that is in contact with the first surface of the light guide plate and that has a refractive index that is substantially the same as that of the light guide plate, a second substrate spaced apart from the first substrate, a first medium formed between the first substrate and the second substrate and that has a refractive index that is the same as or higher than that of the first substrate, a transparent second medium formed between the first substrate and the second substrate that is not mixed with the first medium and that has a refractive index lower than that of the first substrate, a barrier wall dividing the space formed between the first substrate and the second substrate into a plurality of cells arranged in a 2D array, and a driving electrode unit disposed in at least one substrate from among the first substrate and the second substrate to control contact between the first substrate and the first medium.

The first medium may be an oil-based medium and the second medium may be a water-soluble medium.

A reflective material may be formed in an interface between the first medium and the second medium.

The driving electrode unit may comprise a first electrode pattern disposed on an upper surface of the first substrate, a first insulating layer that covers the first electrode pattern and that has an upper surface that has a hydrophobic property, a second substrate spaced apart from the first substrate, a second electrode pattern disposed on a lower surface of the second substrate, and a second insulating layer that covers the second electrode pattern and that has a lower surface that has a hydrophobic property.

The switch array may further comprise a passive matrix driving circuit or an active matrix driving circuit for applying a voltage to the driving electrode unit.

The first substrate and the light guide plate may be formed as one body.

The switch may comprise a first substrate that is in contact with the first surface of the light guide plate and that has a refractive index that is substantially the same as that of the light guide plate, a membrane disposed between the first substrate and the second substrate and that is elastically deformed to contact the first substrate, a barrier wall dividing a space formed between the first substrate and the second substrate into a plurality of cells arranged in a 2D array and supporting the membrane, and a driving electrode unit disposed in at least one substrate from among the first substrate and the second substrate to control contact between the first substrate and the membrane.

The membrane may comprise a deformed layer formed adjacent to the first substrate and formed of a transparent elastic material that has a refractive index that is the same as or higher than that of the first substrate, and a transparent membrane electrode disposed on the deformed layer.

The switch array may further comprise a passive matrix driving circuit or an active matrix driving circuit for applying a simple voltage to the driving electrode unit.

The first substrate and the light guide plate may be formed as one body.

An optical pattern may be formed in a second surface of the light guide plate facing the first surface of the light guide plate to guide light that has entered the light guide plate to be total internal reflected.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
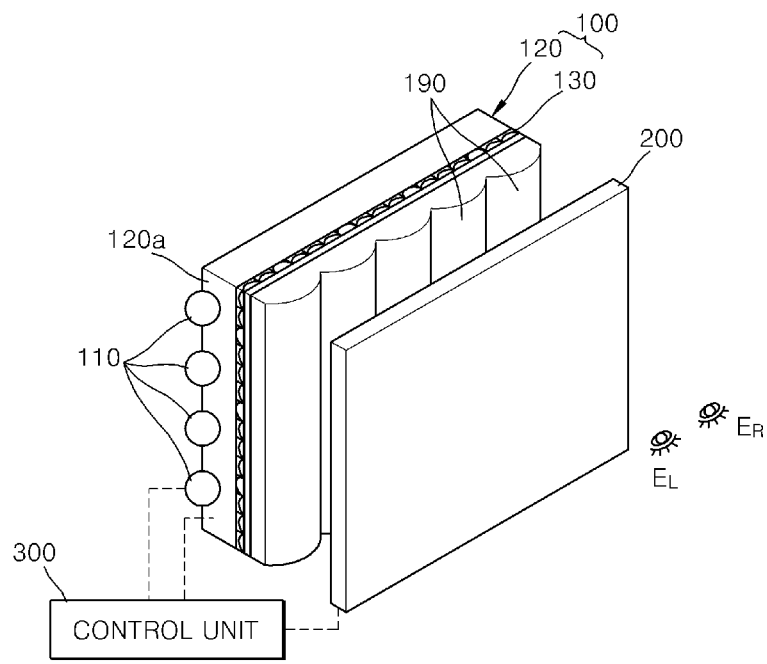
FIG. 1 is a diagram illustrating an example of a two-dimensional/three-dimensional (2D/3D) switchable image display device.
Figure 2:
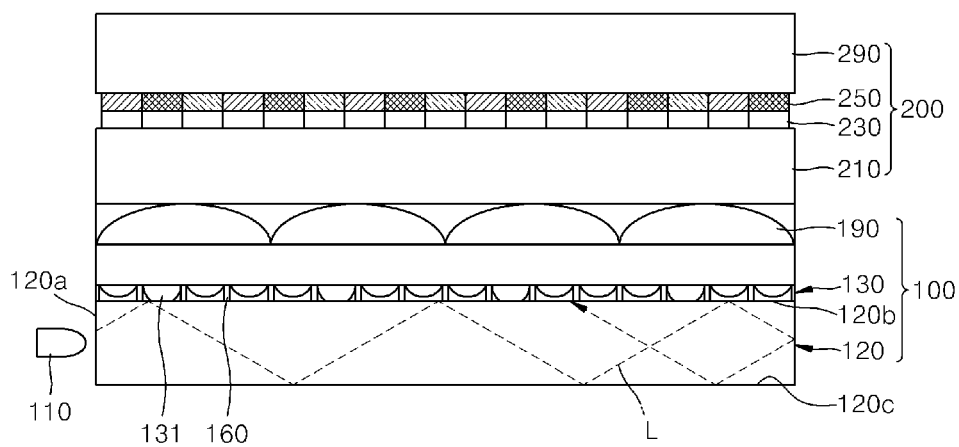
FIG. 2 is a diagram illustrating another example of the 2D/3D switchable image display device of FIG. 1.

FIG. 1 illustrates an example of a two-dimensional/three-dimensional (2D/3D) switchable image display device. FIG. 2 is a diagram illustrating another example of the 2D/3D switchable image display device of FIG. 1.

Referring to FIGS. 1 and 2, the 2D/3D switchable image display device includes a backlight unit 100, an image panel 200 that generates an image by modulating light L emitted from the backlight unit 100 according to image information, and a control unit 300 that controls the backlight unit 100 and the image panel 200.

The backlight unit 100 is disposed at a rear side of the image panel 200 and includes a light source 110, a light guide plate 120, a switch array 130, and a lens array 190. The backlight unit 100 may emit the light L non-directionally in a 2D mode and may emit the light L directionally in a 3D mode using the switch array 130 and the lens array 190.

The light source 110 may be disposed in at least one side surface 120a of the light guide plate 120. The light source 110 may be a point light source, for example, a light emitting diode (LED), a line light source such as a cold cathode fluorescent lamp (CCFL), and the like.

The light L emitted from the light source 110 may be total-internal-reflected in the light guide plate 120. For example, the light guide plate 120 may be formed of a transparent material such as glass or plastic. The light guide plate 120 may have a flat panel shape. In this example, the switch array 130 is disposed on a first surface 120b of the light guide plate 120. An optical pattern (not shown) may be disposed on a second surface 120c facing the first surface 120b of the light guide plate 120 and may be used to guide the total internal reflection.

The switch array 130 may be disposed on the first surface 120b of the light guide plate 120. The switch array 130 includes a plurality of switches 131 that are capable of operating independently. As shown in FIG. 2, the plurality of switches 131 are divided by a barrier wall 160 and are arranged in a 2D matrix array. Each of the plurality of switches 131 may be total-internal-reflected inside the light guide plate 120 by changing a boundary condition of a refractive index in the first surface 120b of the light guide plate 120 according to an ON/OFF switch. The plurality of switches 131 may selectively emit the light L trapped in the light guide plate 120. The switch array 130 may use an electrowetting principle, as is described further herein.

The lens array 190 may direct the light L emitted from the switch array 130 to at least two different view zones to directionally emit light. For example, the lens array 190 may be a lenticular lens sheet in which semi-cylindrical lenses extending in a perpendicular direction are arranged in a horizontal direction, as illustrated in FIG. 1. When the lens array 190 is the lenticular lens sheet, the lens array 190 may direct the passing light L to a plurality of view zones in a horizontal direction. The position of the divided view zone may vary according to an optical design.

The image panel 200 displays an image according to image information. For example, the image panel 200 may be a transmissive flat panel such as a liquid crystal panel, a polymer dispersed liquid crystal panel, an electrowetting display panel, an electrochromic display panel, and the like. For example, as illustrated in FIG. 2, the image panel 200 may be a liquid crystal panel in which a liquid crystal layer 230 is disposed between a lower plate 210 and an upper plate 290. In the liquid crystal layer 230, a plurality of liquid crystal cells corresponding to respective pixels are independently driven in order to represent a gray scale of the pixel. The image panel 200 may further include a color filter 250 to represent color.

The control unit 300 controls the backlight unit 100 and the image panel 200. For example, in a 2D mode, the control unit 300 may control the backlight unit 100 to emit the light L to all the view zones and may control the image panel 200 to display a 2D image corresponding to one viewpoint. As another example, in a 3D mode, the control unit 300 may control the backlight unit 100 to sequentially emit the light L to different view zones and may control the image panel 200 to sequentially display images corresponding to different viewpoints based on binocular parallax.

Figure 3:
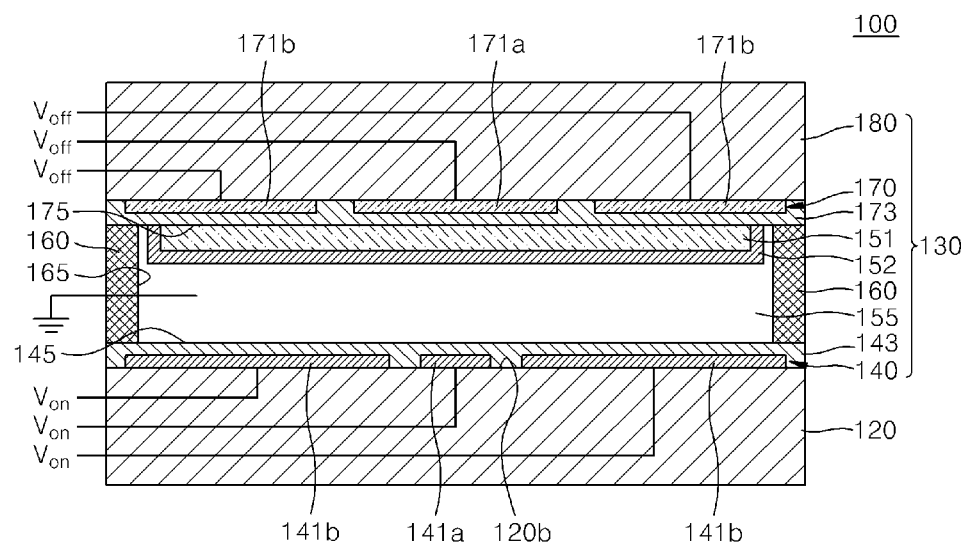
FIG. 3 is a diagram illustrating an example of an OFF state of a switch of a switch array of the 2D/3D switchable image display device of FIG. 1.
Figure 4:
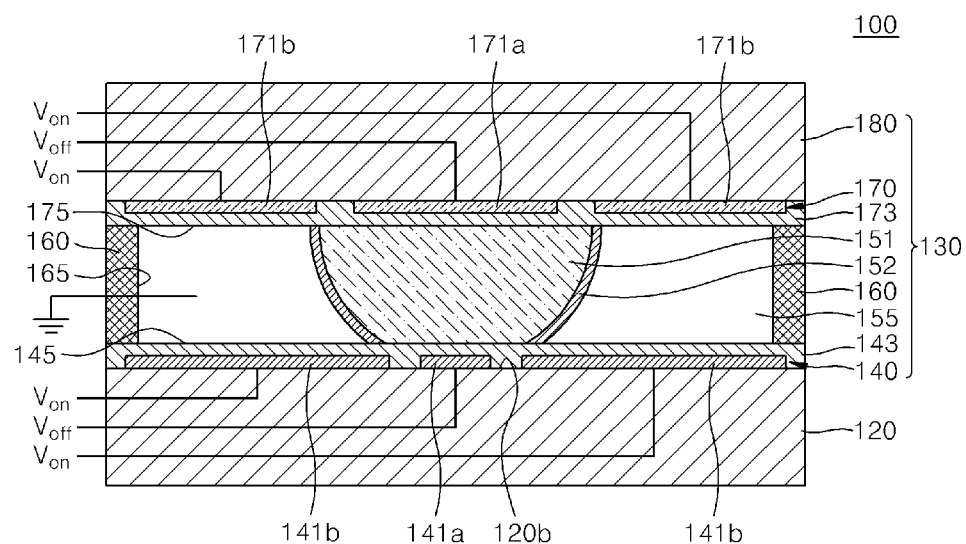
FIG. 4 is a diagram illustrating an example of an ON state of the switch of the switch array of the 2D/3D switchable image display device of FIG. 1.

FIGS. 3 and 4 illustrate examples of a switch of the switch array 130. Referring to FIGS. 3 and 4, the switch array 130 includes a lower electrode structure 140 disposed on the first surface 120b of the light guide plate 120, a second substrate 180 that faces the light guide plate 120, an upper electrode structure 170 disposed on a lower surface of the second substrate 180, a first medium 151 and a second medium 155 that fill a space between the light guide plate 120 and the second substrate 180, and a barrier wall 160 that divides the space between the light guide plate 120 and the second substrate 180 into a plurality of cells 165 that are arranged in a 2D array. The second substrate 180 is spaced apart from the light guide plate 120 and may be formed of a transparent material such as glass or plastic. The cell 165 that is divided by the barrier wall 160 corresponds to a switch for determining whether or not light is emitted from the light guide plate 120.

The first medium 151 and the second medium 155 may have different refractive indexes and they may be separate from each other. The first medium 151 may include a material that has a refractive index that is the same as or higher than that of the light guide plate 120. The second medium 155 may include a material that has a refractive index that is lower than that of the light guide plate 120. For example, the first medium 151 may be oil, and the second medium 155 may be a water-soluble liquid. The second medium 155 may be grounded by a separate electrode (not shown). A reflective material may float in an interface between the first medium 151 and the second medium 155, thereby generating a reflective layer 152. For example, the reflective material may be a metal fragment that is coated with a transparent dielectric material. As illustrated in FIG. 4, when the switch is turned-on, the reflective layer 152 reflects light emitted through a contact area between the first medium 151 and the light guide plate 120 frontward within a predetermined angle.

The lower electrode structure 140 may include, for example, first and second electrodes 141a and 141b, disposed on the light guide plate 120, and a first insulating layer 143 covering the first and second electrodes 141a and 141b. The upper electrode structure 170 may include third and fourth electrodes 171a and 171b, disposed on a lower surface of the second substrate 180, and a second insulating layer 173 covering the third and fourth electrodes 171a and 171b. The first through fourth electrodes 141a, 141b, 171a and 171b may be formed of a transparent conductive material, for example, an indium tin oxide (ITO). In this example, the first medium 151 and the light guide plate 120 are in contact with each other, according to patterns of the first and second electrodes 141a and 141b. The meniscus shape of the first medium 151, such as a width and a height may be adjusted by patterns of the third and fourth electrodes 171a and 171b. For example, the first electrode 141a may be disposed on the first surface 120b that corresponds to the center of the cell 165, and the second electrode 141b may be disposed around the first electrode 141a. The third electrode 171a may be disposed on the lower surface of the second substrate 180 that corresponds to the center of the cell 165, and the fourth electrode 171b may be disposed around the third electrode 171a. For example, the first electrode 141a may be relatively small, and the third electrode 171a may be relatively large.

A surface 145 of the first insulating layer 143 and a surface 175 of the second insulating layer 173 may have hydrophobic surface characteristics, superhydrophobic surface characteristics, and the like. The hydrophobic surface characteristics may be obtained, for example, when materials of the first and second insulating layers 143 and 173 are hydrophobic or when the first and second insulating layers 143 and 173 are coated with a hydrophobic thin film. When a voltage is applied to the first and second electrodes 141a and 141b, a surface characteristic of the first insulating layer 143 may be changed into a wetting state with respect to the second medium 155. When a voltage is applied to the third and fourth electrodes 171a and 171b, a surface characteristic of the second insulating layer 173 may be changed into a wetting state with respect to the second medium 155.

A driving circuit may be included in the switch array 130 and may be used to apply a voltage to the first through fourth electrodes 141a, 141b, 171a and 171b. For example, when the switch array 130 is driven in a passive matrix mode, a passive matrix driving circuit may be may be electrically connected to the first through fourth electrodes 141a, 141b, 171a and 171b. Alternatively, when the switch array 130 is driven in an active matrix mode, a pixel circuit of a separate thin film transistor (TFT) may be included in each switch to independently apply a voltage to the first through fourth electrodes 141a, 141b, 171a and 171b.

The switch array 130 includes a space sufficient for realizing the meniscus shape of the first medium 151. Accordingly, the switch array 130 has a compact structure that may be formed on a flat panel, in comparison to an example in which a directional light source is formed using an optical system including an existing lens.

In this example, the lower electrode structure 140 is disposed on the first surface 120b of the light guide plate 120, but this is just an example. That is, a separate first substrate on which the lower electrode structure 140 is provided and the light guide plate 120 are formed as one body in this example, but the backlight unit 100 is not limited thereto. For example, the lower electrode structure 140 may be disposed on a first substrate and formed of a material that has a refractive index that is substantially the same as that of the light guide plate 120, and the first substrate may be coupled to the first surface 120b of the light guide plate 120. In this example, the light guide plate 120 and the first substrate are optically coupled to each other, and light L incident on the light guide plate 120 may be total-internal-reflected and trapped both inside the light guide plate 120 and inside the first substrate.

In this example, the first medium 151 is oil, and the first medium 151 is a water-soluble liquid, but this is just an example, and the backlight unit 100 is not limited thereto. For example, the first medium 151 may be a water-soluble liquid, and the second medium 155 may be oil or air.

Referring to FIGS. 3 and 4, an ON/OFF state of each switch of the 2D/3D switchable backlight unit 100 is described.

FIG. 3 illustrates an example of an OFF state of the switch. Referring to FIG. 3, a voltage is applied to the first and second electrodes 141a and 141b, and the voltage is not applied to the third and fourth electrodes 171a and 171b. Accordingly, the surface 145 of the first insulating layer 143 is changed from a hydrophobic state into a wetting state, and the second insulating layer 173 maintains a hydrophobic state. As a result, the first medium 151, which is oil, is separated from the surface 145 of the first insulating layer 143, and is spread on the surface 175 of the second insulating layer 173, and the surface 145 of the first insulating layer 143 is covered by the second medium 155. In this example, because the second medium 155 is formed of a material having a refractive index lower than that of the light guide plate 120, the first surface 120b of the light guide plate 120 maintains a boundary condition of total internal reflection in which the light L inside the light guide plate 120 is trapped by total internal reflection.

Meanwhile, FIG. 4 illustrates an example of an ON state of the switch. Referring to FIG. 4, a voltage is not applied to the first electrode 141a but is applied to the second electrode 141b. Also, a voltage is not applied to the third electrode 171a but is applied to the fourth electrode 171b. Accordingly, in the surface 145 of the first insulating layer 143, a region corresponding to the first electrode 141a has a hydrophobic property, and the second medium 155 is moved and the first medium 151 contacts the region. Also, in the surface 145 of the first insulating layer 143, a region corresponding to the second electrode 141b is changed into a wetting state, and the region is made wet by the second medium 155. In the surface 175 of the second insulating layer 173, a region corresponding to the third electrode 171a may maintain a hydrophobic property, and the first medium 151 may contact the region. Also, in the surface 175 of the second insulating layer 173, a region corresponding to the fourth electrode 171b may be changed into a wetting state, and the first medium 151 is moved by the second medium 155, thereby increasing a contact angle. As a result, the first medium 151 may have a meniscus shape, which is an inversed triangle shape that corresponds to the shapes of the first electrode 141a and the third electrode 171b.

Because the first medium 151 has a refractive index that is the same as or higher than that of the light guide plate 120, a region where the first surface 120b of the light guide plate 120 contacts the first medium 151 may not satisfy a total internal reflection condition, and the light L trapped inside the light guide plate 120 may escape through a contact area between the first medium 151 and the light guide plate 120. Thus, the light L may be selectively emitted due to the frustrated total internal reflection. Furthermore, the meniscus shape of the first medium 151 may guide the emitted light L to be collected frontward within a predetermined angle. As described above, when the reflective layer 152 is formed in an interface between the first medium 151 and the second medium 155, the direction of light L emitted by the reflective layer 152 may be more effectively guided.

Figure 5:
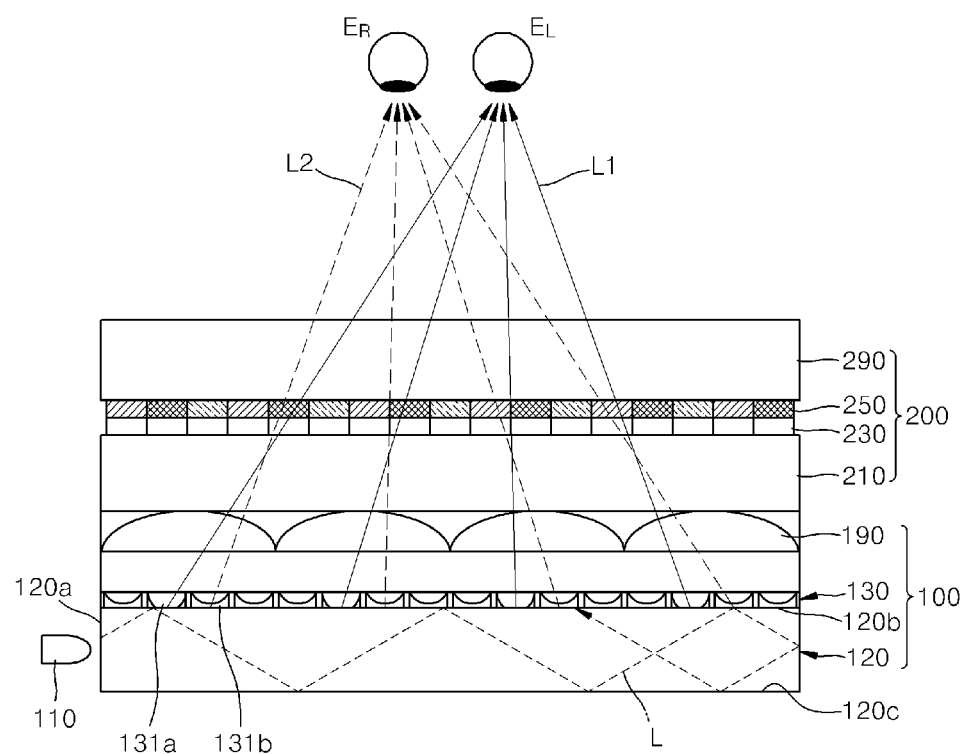
FIG. 5 is a diagram illustrating an example of a 3D mode operation of the 2D/3D switchable image display device of FIG. 1.

FIG. 5 illustrates an example of a 3D mode operation of the 2D/3D switchable image display device of FIG. 1.

Referring to FIG. 5, light L emitted from the light source 110 is incident on the side surface 120a of the light guide plate 120, and then is total-internal-reflected by the first surface 120b and the second surface 120c and the light L is trapped inside the light guide plate 120.

Meanwhile, the lens array 190 directionally emits the light L to different view zones according to the position of the incident light L. Accordingly, a region where the light L is emitted by the switch array 130 varies, and the emitted light L may proceed toward the different view zones by passing through the lens array 190.

FIG. 5 illustrates an example where first switches 131a are turned-on and the other switches are turned-off. In this example, in regions where the first switches 131a are formed, as described above with reference to FIG. 4, frustration of the total internal reflection may occur due to the contact between the first medium 151 and the first surface 120b of the light guide plate 120, and thus the light L trapped inside the light guide plate 120 may escape. In FIG. 5, a light L1 shown as a solid line is emitted only from the first switch 131a, passes through the lens array 190 and proceeds toward a user's left eye $E_L$. Light L2 shown as a dotted line illustrates an example where second switches 131b are turned-on and the other switches are turned-off. The light L2 is emitted from a second switch 131b, passes through the lens array 190, and proceeds toward the user's left eye $E_L$. Because the view zone to which the light L is emitted varies according to the position of the switch of the switch array 130, the backlight unit 100 may be a directional surface light source that sequentially emits light to different view zones according to sequential driving of the switch array 130.

The number of the switches that are sequentially driven in the switch array 130 may correspond to the number of the view zones generated by the lens array 190. For example, the positions and number of the view zones may vary depending on an optical design of the lens array 190, the position of the switch array 130, and an interval between the switches.

The image panel 200 may be synchronized with the control of the switch array 130 to alternately and sequentially display images corresponding to different viewpoints. For example, as illustrated in FIG. 5, when the first switch 131a is turned-on and the other switches are turned-off, the image panel 200 may display an image that corresponds to a first viewpoint. Also, when the second switch 131b is turned-on and the other switches are turned-off, the image panel 200 may display an image that corresponds to a second view point. In this example, the first viewpoint and the second viewpoint may have a binocular parallax. Accordingly, the image corresponding to the first viewpoint may proceed toward a left eye $E_L$, and the image corresponding to the second viewpoint may proceed toward a right eye $E_R$, and a user may experience a stereoscopic effect due to the binocular parallax. As such, there may be a plurality of images corresponding to different viewpoints. For example, the image panel 200 may sequentially display the images corresponding to different viewpoints, and accordingly, the backlight unit 100 sequentially emits light onto the images to corresponding different view zones. The number of the images that are alternately displayed by the image panel 200 may correspond to the number of the view zones generated by the lens array 190. For example, if the lens array 190 directs light into two different view zones, the on/off operations of two groups of switches of the switch array 130 may be alternately controlled, and correspondingly, the image panel 200 may alternately display an image for a left-eye and an image for a light-eye.

Figure 6:
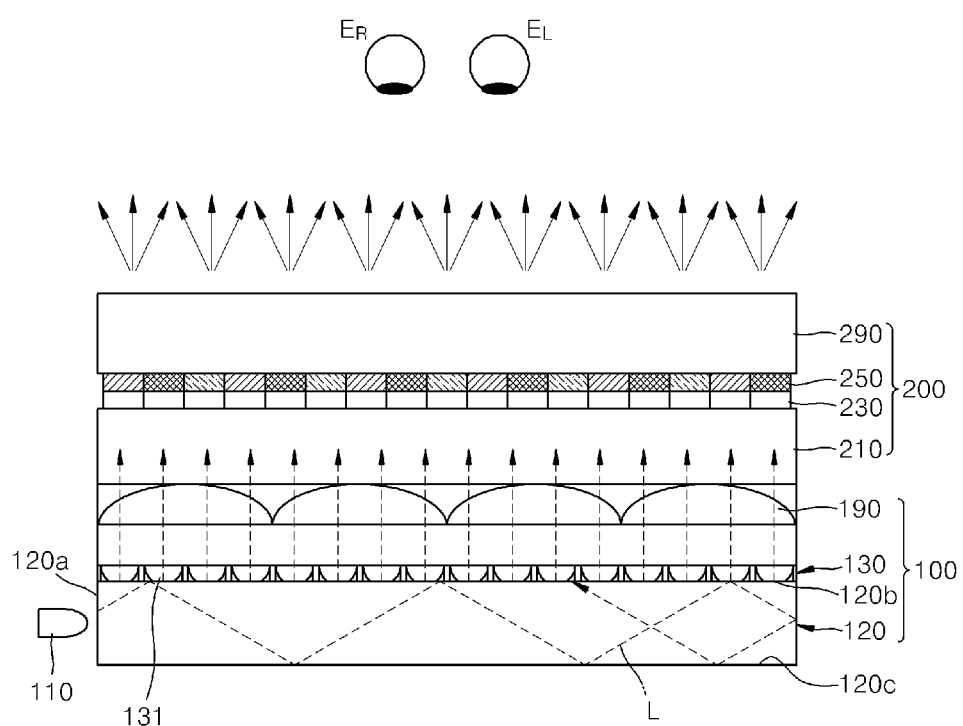
FIG. 6 is a diagram illustrating an example of a 2D mode operation of the 2D/3D switchable image display device of FIG. 1.

FIG. 6 illustrates an example of a 2D mode operation of the 2D/3D switchable image display device of FIG. 1.

Referring to FIG. 6, in the switch array 130 each of the switches 131 are turned-on. Accordingly, light L is emitted over the first surface 120b of the light guide plate 120, and is emitted to each of the view zones via the lens array 190. Meanwhile, the image panel 200 may successively display an image corresponding to one viewpoint. As a result, a user sees the same image with both the left eye $E_L$ and the right eye $E_R$, and a time difference does not occur. Accordingly, a 2D image may be viewed.

In the above-mentioned 2D/3D switchable image display device, light L is emitted from the light guide plate 120 using the frustrated total internal reflection in the 3D mode, and thus the light L trapped inside the light guide plate 120 is reused by the total internal reflection. Thus, the amount of the emitted light L is approximate to the amount of the light L incident from the light source 110 to the light guide plate 120. Accordingly, even though the light L is emitted by some of the switches 131 in the 3D mode, loss of brightness of the light L is reduced and/or prevented.

Figure 7:
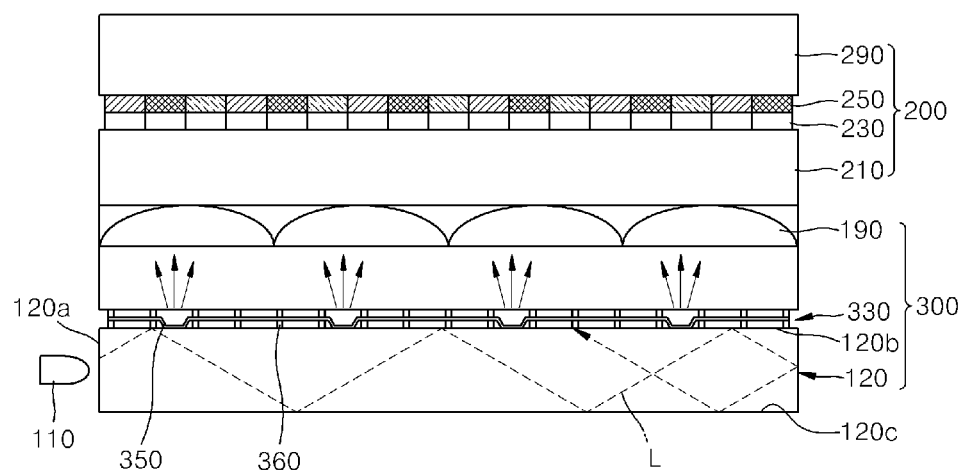
FIG. 7 is a diagram illustrating another example of a 2D/3D switchable image display device.
Figure 8:
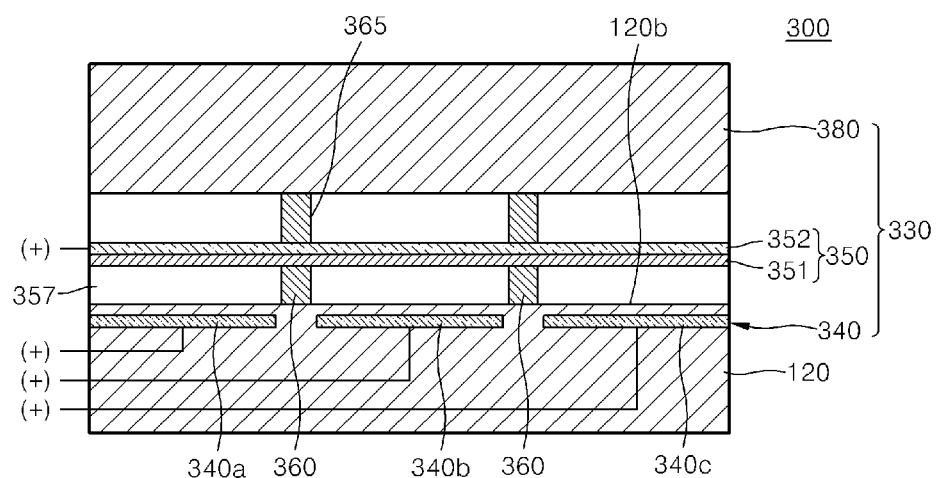
FIG. 8 is a diagram illustrating an example of an OFF state of a switch of a switch array of the 2D/3D switchable image display device of FIG. 7.
Figure 9:
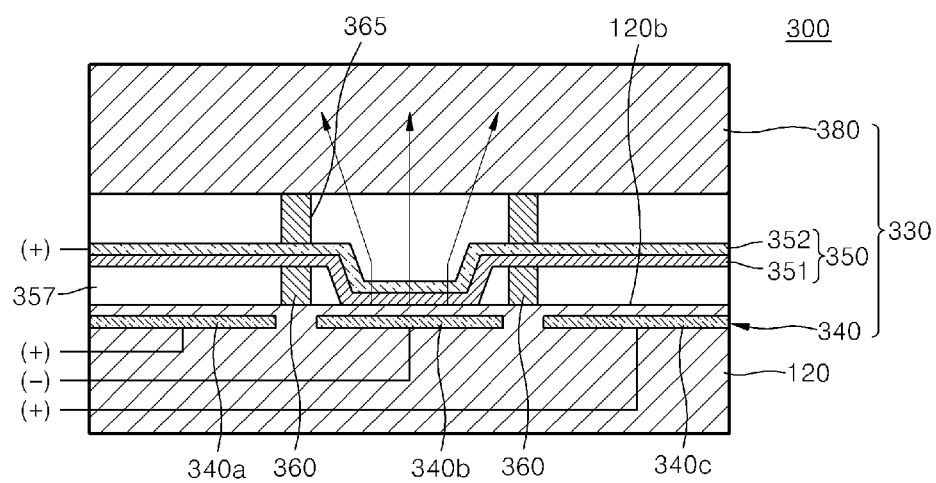
FIG. 9 is a diagram illustrating an example of an ON state of the switch of the switch array of the 2D/3D switchable image display device of FIG. 7.

FIG. 7 illustrates another example of a 2D/3D switchable image display device. FIGS. 8 and 9 illustrate examples of the switch of the switch array 130 of the 2D/3D switchable image display device of FIG. 7.

Referring to FIG. 7, in this example the 2D/3D switchable image display device includes a backlight unit 300, an image panel 200, and a control unit (not shown). In this example, the 2D/3D switchable image display device has the same structure as that of the 2D/3D switchable image display device, except that the device also includes a switch array 330 for inducing frustrated total internal reflection. The switch array 330 may include an electrostatic driving-type micro-electromechanical system (MEMS), which is described below.

Referring to FIGS. 7-9, the switch array 330 includes a lower electrode 340 disposed below a first surface 120b of a light guide plate 120, a second substrate 380 facing the light guide plate 120, a membrane 350 formed between the light guide plate 120 and the second substrate 380, and a barrier wall 360 supporting the membrane 350 formed between the light guide plate 120 and the second substrate 380 and dividing a space 357 into a plurality of cells 365 arranged in a 2D array. As an example, the space 357 between the light guide plate 120 and the second substrate 180 may be emptied or filled with air. The second substrate 380 may be spaced apart from the light guide plate 120 and may be include a transparent material, for example, glass or plastic. The lower electrode 340 may be disposed in each of the cells 465 and may be independently wired. In this example, the cell 365 divided by the barrier wall 360 corresponds to one switch for determining whether or not light is emitted from the light guide plate 120.

The membrane 351 may be elastically deformed to contact the light guide plate 120. The membrane 351 may have a bi-layered structure that includes a deformed layer 351 facing the first surface 120b of the light guide plate 120 and a membrane electrode 352 that is disposed on the deformed layer 351. For example, the deformed layer 351 may include a transparent elastic material that has a refractive index that is the same as or higher than that of the light guide plate 120. The membrane electrode 352 may include a transparent conductive material such as an indium tin oxide (ITO). The following example includes the deformed layer 351 has a single-layered structure, but this is just an example, and it should be understood that the backlight unit 300 is not limited thereto. For example, the deformed layer 351 may have a bi-layered structure that includes a dielectric layer that has a refractive index that is the same as or higher than that of the light guide plate 120 and an elastic layer that includes an elastic material.

A driving circuit may be disposed in the switch array 330 to apply a voltage to the lower electrode 340 and the membrane electrode 352. For example, when the switch array 330 is driven in a passive matrix mode, a passive matrix driving circuit may be electrically connected to the lower electrode 340 and the membrane electrode 352. Alternatively, a pixel circuit of a separate thin-film transistor (TFT) that may be disposed in each switch of the light guide plate 120 to independently apply a voltage to the lower electrode 340 and/or the membrane electrode 352.

The following example described includes the lower electrode 340 disposed directly on the first surface 120b of the light guide plate 120, but this is just an example, and it should be understood that the backlight unit 300 is not limited thereto. For example, the lower electrode 340 may be disposed in a separate first substrate formed of a material that has a refractive index that is the same as that of the light guide plate 120, and the first substrate may be coupled to the first surface 120b of the light guide plate 120. In this example, the light guide plate 120 and the first substrate are optically coupled to each other such that the light L incident on the light guide plate 120 may be total-internal-reflected and trapped both inside the light guide plate 120 and the first substrate.

FIG. 8 illustrates an example of an OFF state of the switch. Referring to FIG. 8, a positive voltage may be applied to lower electrodes 340a, 340b and 340c, and a positive voltage may be applied to the membrane electrode 352. In this example, positive charges are guided to the lower electrodes 340a, 340b and 340c, and the membrane electrode 352. The membrane 350 is separated from the first surface 120b of the light guide plate 120 by a repulsive force caused by the charges having the same polarity. The first surface 120b of the light guide plate 120 maintains a boundary condition of total internal reflection in which the light L inside the light guide plate 120 is trapped by total internal reflection.

FIG. 9 illustrates an example of an ON state of the switch. Referring to FIG. 9, a negative voltage may be applied to the lower electrode 340b, a positive voltage may be applied to the lower electrodes 340a and 340c, and a positive voltage may be applied to the membrane electrode 352. In this example, negative charges are guided to the lower electrode 340b to which the negative voltage is applied, and positive charges are guided to the membrane electrode 352. The opposite polarities generate an attractive force and membrane 350 contacts the first surface 120b of the light guide plate 120 that corresponds to the lower electrode 340b. Because the deformed layer 351 of the membrane 350 has a refractive index that is the same as or higher than that of the light guide plate 120, frustrated total internal reflection may occur in a contact area between the first surface 120b of the light guide plate 120 and the deformed layer 351, and the trapped light L may escape through the contact area therebetween. As such, using frustrated total internal reflection light may be selectively emitted.

When the switch array 330 emits the light L by selectively contacting the membrane 350 and the light guide plate 120 by using an electrostatic driving force, similarly to the examples described with reference to FIGS. 1 through 6, images corresponding to different viewpoints may be sequentially displayed in a 3D mode, and light may be selectively emitted to the corresponding view zone under the control of the switch array 330, and a 3D image may be displayed. Also, the image panel 200 displays an image corresponding to one viewpoint in a 2D mode, and the backlight unit 300 displays a 2D image under the control of the switch array 330 to emit light to each of the view zones at the same time.

In the 2D/3D switchable image display device described herein, a lenticular lens sheet may be used as a lens array 190, but this is just an example, and it should be understood that the image display device is not limited thereto. The lens array 190 may include a plurality of lenses arranged in a 2D array. In this example, the lens array 190 may direct the light L emitted through the switch arrays 130 and 330 into a plurality of view zones in a horizontal direction or a vertical direction. In this example, in the 3D mode, the backlight units 100 and 300 may control the switch arrays 130 and 330 to sequentially emit light to the different view zones in both horizontal and vertical directions, and the image panel 200 may display an image corresponding to a viewpoint of the corresponding view zone.

Figure 10:
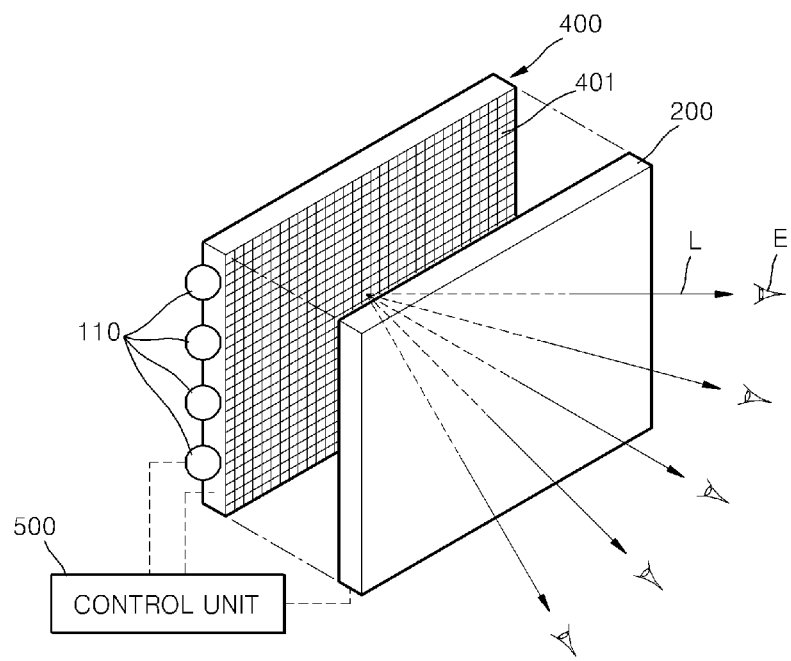
FIG. 10 is a diagram illustrating another example of a 2D/3D switchable image display device.

FIG. 10 illustrates another example of a 2D/3D switchable image display device.

Referring to FIG. 10, the 2D/3D switchable image display device may be a 3D image display device based on an integral imaging technique. The 2D/3D switchable image display device includes a backlight unit 400, an image panel 200, and a control unit 500 that controls the backlight unit 400 and the image panel 200.

The backlight unit 400 is formed at a rear side of the image panel 200 and emits light to the image panel 200. In this example, the backlight unit 400 includes a light source 110, a light guide plate 120, and a switch array 130. A structure including the light source 110, the light guide plate 120, and the switch array 130 may be the same as the above-mentioned examples. That is, the backlight unit 400 may be the same as the backlight units 100 and 300, except that the backlight unit 400 does not include a lens array.

The control unit 500 controls the backlight unit 400 and the image panel 200. In a 2D mode, the control unit 500 controls the backlight unit 400 to emit the light L to all view zones, and also controls the image panel 200 to display a 2D image corresponding to one viewpoint. Also, the control unit 500 may control the backlight unit 400 to be a point light source array, and may control the image panel 200 to display elementary images of a 3D image based on an integral imaging technology.

Figure 11:
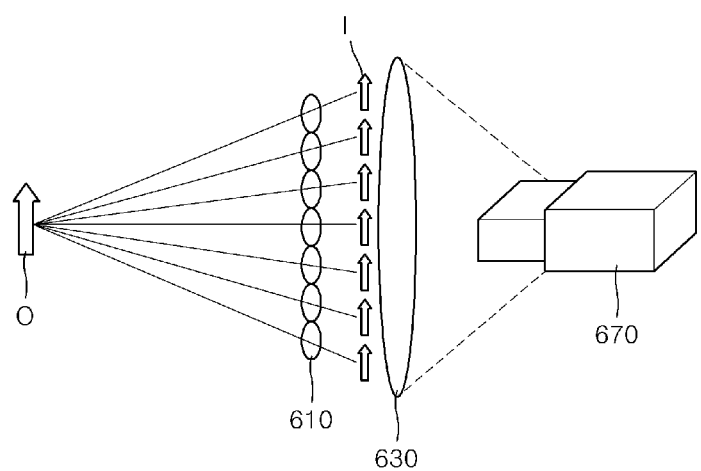
FIG. 11 is a diagram illustrating an example for obtaining elementary images of a 3D image based on an integral imaging technology.

Hereinafter, the 3D mode of the 2D/3D switchable image display device is described with reference to FIGS. 11 and 12.

The integral imaging technique is a 3D display technique, first proposed by Lippmann in 1908, and further developed by others since that time. For example, elementary images of a 3D image based on integral imaging technology may be generated through calculation or may be captured by a camera. FIG. 11 illustrates an example of obtaining elementary images of the 3D image based on the integral imaging technology. Referring to FIG. 11, a 3D object is individually focused through a lens array 610 including a plurality of elemental lenses in order to form elementary images I. The focused elementary images I are focused on a focusing lens 630 and captured by a capturing unit 670. As another example, the elementary images of a virtual 3D object may be generated by a computer. Because the plurality of elementary images include information of a 3D image, a 3D image may be displayed by composing the elementary images inversely. Restoration from the elementary images to the 3D image may be performed by displaying the elementary images on an image panel (200 of FIG. 12) and emitting light on the elementary images using the point light source array corresponding to the lens array 710.

Figure 12:
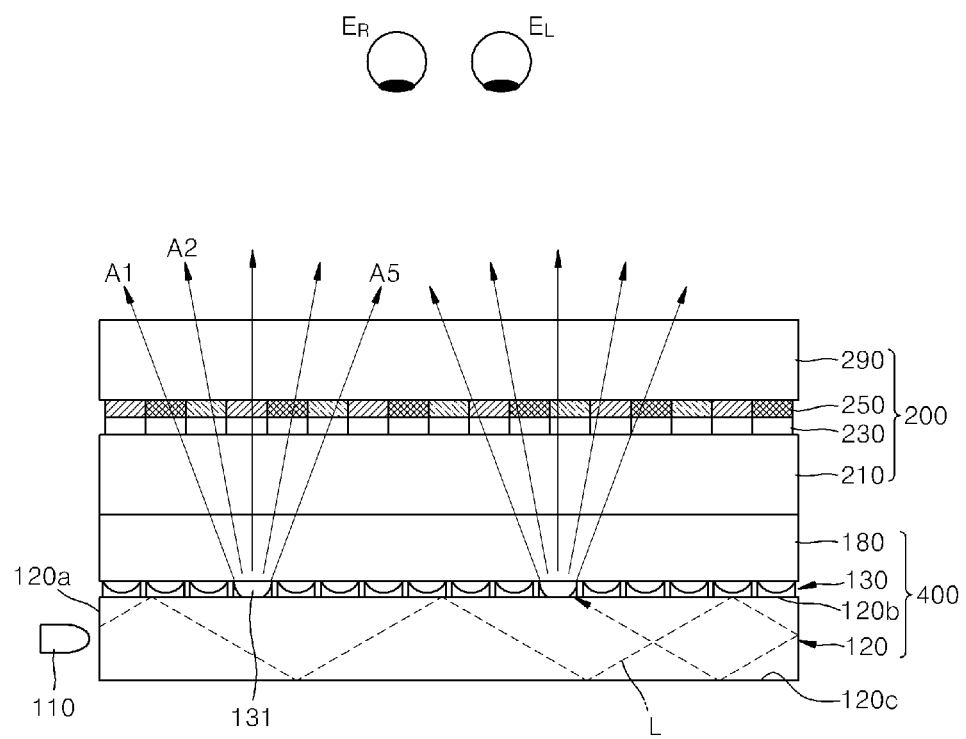
FIG. 12 is a diagram illustrating an example of a 3D mode operation of the 2D/3D switchable image display device of FIG. 10.

FIG. 12 illustrates an example of a 3D mode operation of the 2D/3D switchable image display device of FIG. 10. Referring to FIG. 12, some of switches 131 of the switch array 130 may be driven in an ON state such that the backlight unit 100 becomes a point light source array. The image panel 200 may display elementary images of a 3D image based on an integral imaging technology. As a result, lights A1 through A5 emitted from the switches 131, which are turned-on to form a point light source array, form elementary images passing through the image panel 200. Accordingly, a 3D image may be generated by combining the elementary images.

As described above with reference to FIG. 4, an area where the light L is emitted from the switches 131 may be a contact area between a first medium 151 and a first surface 120b of a light guide plate 120. The contact area may be proportional to the size of a first electrode 141a. Accordingly, the size of the first electrode 141a may be minimized to reduce the size of the point light source and to reduce blurring caused by the size of the point light source.

Because the switch array 130 according to the current example emits the light L trapped inside the light guide plate 120 using frustrated total internal reflection, even though the backlight unit 400 functions as a point light source array, and loss of brightness of the light L may be reduced and/or prevented.

Figure 13:
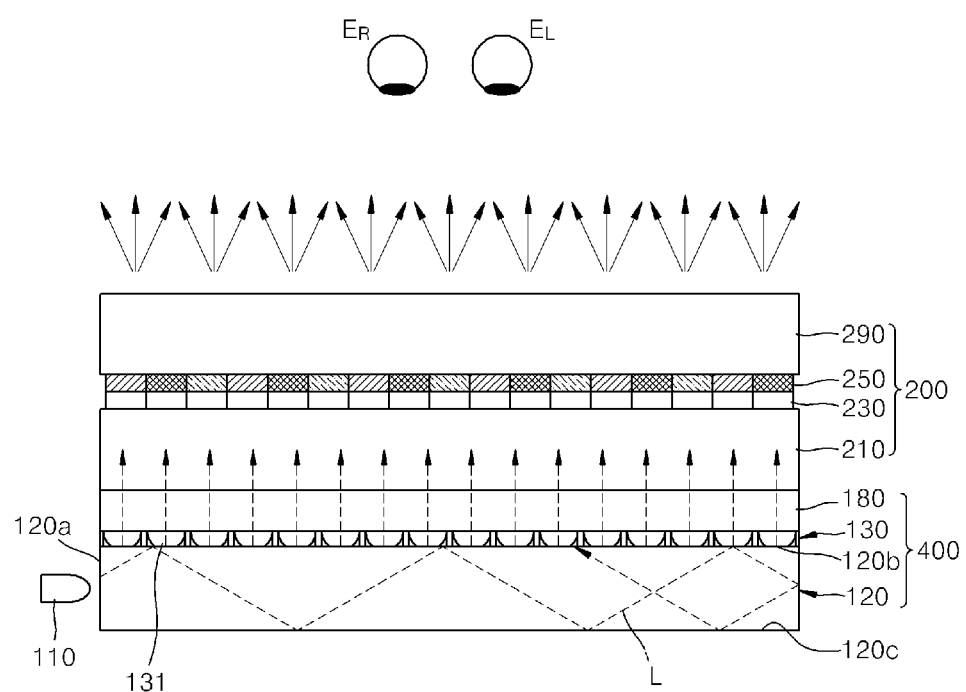
FIG. 13 is a diagram illustrating an example of a 2D mode operation of the 2D/3D switchable image display device of FIG. 10.

FIG. 13 illustrates an example of a 2D mode operation of the 2D/3D switchable image display device of FIG. 10. Referring to FIG. 13, each of the switches 131 of the switch array 130 are turned-on. Accordingly, light L is emitted all over the first surface 120b of the light guide plate 120, and thus the backlight unit 400 becomes a surface light source. The image panel 200 may successively display an image corresponding to one viewpoint. As a result, because a user sees the same image with both a left eye $E_L$ and a right eye $E_R$, a time difference does not occur, and a 2D image may be viewed.

The 2D/3D switchable image display device described herein may include, for example, a switch array that uses electrowetting or a switch array that has a MEMS structure using an electrostatic driving force as a switch array for inducing frustrated total internal reflection. However, this is just an example, and the device is not limited thereto. For example, variously shaped switch arrays capable of selectively inducing frustrated total internal reflection by inducing a local contact to the light guide plate 120 may be employed.

The 2D/3D switchable backlight unit according to the above-mentioned examples and the 2D/3D switchable image display device including the 2D/3D switchable backlight unit includes a switch array that selectively emits light using frustrated total internal reflection in a total-internal-reflecting light guide plate, thereby increasing light utilization efficiency and also preventing loss of brightness of light from occurring in a 3D mode. Furthermore, because a switch array has a structure that is capable of easily being installed in a flat panel, the 2D/3D switchable image display device can be made compact.

The methods, functions, processes, and examples described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A two-dimensional/three-dimensional (2D/3D) switchable backlight unit comprising:
    a light source;
    a light guide plate in which light emitted from the light source is total-internal-reflected; and
    a switch array comprising a plurality of switches that selectively contact a first surface of the light guide plate and emit light from a contact area of the first surface of the light guide plate where frustrated total internal reflection occurs due to contact between the switch and the first surface of the light guide plate,
    wherein, in 2D mode, all the switches contact the first surface of the light guide plate, and in 3D mode, some, but not all of the switches, contact the first surface of the light guide plate.

2. The 2D/3D switchable backlight unit of claim 1, further comprising a lens array for directing the light emitted from the switch array into at least two different view zones.

3. The 2D/3D switchable backlight unit of claim 2, wherein the lens array comprises a plurality of semi-cylindrical lenses arranged in parallel or in a 2D array.

4. The 2D/3D switchable backlight unit of claim 1, wherein the switch comprises:
    a first substrate in contact with the first surface of the light guide plate and that has a refractive index that is substantially the same as that of the light guide plate;
    a second substrate spaced apart from the first substrate;
    a first medium formed between the first substrate and the second substrate and that has a refractive index that is the same as or higher than that of the first substrate;
    a transparent second medium formed between the first substrate and the second substrate that is not mixed with the first medium and that has a refractive index lower than that of the first substrate;
    a barrier wall dividing the space formed between the first substrate and the second substrate into a plurality of cells arranged in a 2D array; and
    a driving electrode unit disposed in at least one substrate from among the first substrate and the second substrate to control contact between the first substrate and the first medium.

5. The 2D/3D switchable backlight unit of claim 4, wherein the first medium is an oil-based medium, and the second medium is a water-soluble medium.

6. The 2D/3D switchable backlight unit of claim 4, wherein a reflective material is formed in an interface between the first medium and the second medium.

7. The 2D/3D switchable backlight unit of claim 4, wherein the driving electrode unit comprises:
    a first electrode pattern disposed on an upper surface of the first substrate;
    a first insulating layer that covers the first electrode pattern and that has an upper surface that has a hydrophobic property;
    a second substrate spaced apart from the first substrate;
    a second electrode pattern disposed on a lower surface of the second substrate; and
    a second insulating layer that covers the second electrode pattern and that has a lower surface that has a hydrophobic property.

8. The 2D/3D switchable backlight unit of claim 4, wherein the switch array further comprises a passive matrix driving circuit or an active matrix driving circuit for applying a voltage to the driving electrode unit.

9. The 2D/3D switchable backlight unit of claim 4, wherein the first substrate and the light guide plate are formed as one body.

10. The 2D/3D switchable backlight unit of claim 1, wherein the switch comprises:
   a first substrate in contact with the first surface of the light guide plate and that has a refractive index that is substantially the same as that of the light guide plate;
   a membrane disposed between the first substrate and the second substrate and that is elastically deformed to contact the first substrate;
   a barrier wall dividing a space formed between the first substrate and the second substrate into a plurality of cells arranged in a 2D array and supporting the membrane; and
   a driving electrode unit disposed in at least one substrate from among the first substrate and the second substrate to control contact between the first substrate and the membrane.

11. The 2D/3D switchable backlight unit of claim 10, wherein the membrane comprises a deformed layer formed adjacent to the first substrate and formed of a transparent elastic material that has a refractive index that is the same as or higher than that of the first substrate, and a transparent membrane electrode disposed on the deformed layer.

12. The 2D/3D switchable backlight unit of claim 10, wherein the switch array further comprises a passive matrix driving circuit or an active matrix driving circuit for applying a simple voltage to the driving electrode unit.

13. The 2D/3D switchable backlight unit of claim 10, wherein the first substrate and the light guide plate are formed as one body.

14. The 2D/3D switchable backlight unit of claim 1, wherein an optical pattern is formed in a second surface of the light guide plate facing the first surface of the light guide plate to guide light that has entered the light guide plate to be total internal reflected.

15. A 2D/3D switchable image display device comprising:
   an image panel forming an image by modulating light according to image information;
   a backlight unit for emitting light to the image panel, the backlight unit comprising a switch array that includes a light source, a light guide plate in which the light emitted from the light source is total-internal-reflected, and a plurality of switches that selectively contact a first surface of the light guide plate, wherein the switch array emits light from a contact area of the first surface of the light guide plate where frustrated total reflection occurs due to contact between the switch and the first surface of the light guide plate; and
   a control unit for controlling the switch array such that all of the switches contact one surface of the light guide plate in a 2D mode and such that some, but not all of the switches, contact the one surface of the light guide plate in a 3D mode.

16. The 2D/3D switchable image display device of claim 15, wherein the control unit controls the image panel to sequentially display images corresponding to different viewpoints in a 3D mode, and controls the backlight unit such that the switch array emits light corresponding to a viewpoint of the displayed image.

17. The 2D/3D switchable image display device of claim 16, further comprising a lens array for directing the light emitted from the switch array to at least two different view zones.

18. The 2D/3D switchable image display device of claim 17, wherein the lens array comprises a plurality of semi-cylindrical lens arranged in parallel or in a 2D array.

19. The 2D/3D switchable image display device of claim 15, wherein the control unit controls the image panel to display elementary images based on an integral imaging technology and controls the backlight unit such that the switch array drives the switch corresponding to the displayed elementary images.

20. The 2D/3D switchable image display device of claim 15, wherein the control unit controls the image panel to display an image corresponding to one viewpoint and controls the backlight unit such that each of the switches of the switch array emits light.

21. The 2D/3D switchable image display device of claim 15, wherein the switch comprises:
   a first substrate that is in contact with the first surface of the light guide plate and that has a refractive index that is substantially the same as that of the light guide plate;
   a second substrate spaced apart from the first substrate;
   a first medium formed between the first substrate and the second substrate and that has a refractive index that is the same as or higher than that of the first substrate;
   a transparent second medium formed between the first substrate and the second substrate that is not mixed with the first medium and that has a refractive index lower than that of the first substrate;
   a barrier wall dividing the space formed between the first substrate and the second substrate into a plurality of cells arranged in a 2D array; and
   a driving electrode unit disposed in at least one substrate from among the first substrate and the second substrate to control contact between the first substrate and the first medium.

22. The 2D/3D switchable image display device of claim 21, wherein the first medium is an oil-based medium and the second medium is a water-soluble medium.

23. The 2D/3D switchable image display device of claim 21, wherein a reflective material is formed in an interface between the first medium and the second medium.

24. The 2D/3D switchable image display device of claim 21, wherein the driving electrode unit comprises:
   a first electrode pattern disposed on an upper surface of the first substrate;
   a first insulating layer that covers the first electrode pattern and that has an upper surface that has a hydrophobic property;
   a second substrate spaced apart from the first substrate;
   a second electrode pattern disposed on a lower surface of the second substrate; and
   a second insulating layer that covers the second electrode pattern and that has a lower surface that has a hydrophobic property.

25. The 2D/3D switchable image display device of claim 21, wherein the switch array further comprises a passive matrix driving circuit or an active matrix driving circuit for applying a voltage to the driving electrode unit.

26. The 2D/3D switchable image display device of claim 21, wherein the first substrate and the light guide plate are formed as one body.

27. The 2D/3D switchable image display device of claim 15, wherein the switch comprises:
   a first substrate that is in contact with the first surface of the light guide plate and that has a refractive index that is substantially the same as that of the light guide plate;

a membrane disposed between the first substrate and the second substrate and that is elastically deformed to contact the first substrate;

a barrier wall dividing a space formed between the first substrate and the second substrate into a plurality of cells arranged in a 2D array and supporting the membrane; and a driving electrode unit disposed in at least one substrate from among the first substrate and the second substrate to control contact between the first substrate and the membrane.

28. The 2D/3D switchable image display device of claim 27, wherein the membrane comprises a deformed layer formed adjacent to the first substrate and formed of a transparent elastic material that has a refractive index that is the same as or higher than that of the first substrate, and a transparent membrane electrode disposed on the deformed layer.

29. The 2D/3D switchable image display device of claim 27, wherein the switch array further comprises a passive matrix driving circuit or an active matrix driving circuit for applying a simple voltage to the driving electrode unit.

30. The 2D/3D switchable image display device of claim 27, wherein the first substrate and the light guide plate are formed as one body.

31. The 2D/3D switchable image display device of claim 15, wherein an optical pattern is formed in a second surface of the light guide plate facing the first surface of the light guide plate to guide light that has entered the light guide plate to be total internal reflected.

* * * * *